United States Patent
Hamahata et al.

(10) Patent No.: US 11,228,649 B2
(45) Date of Patent: Jan. 18, 2022

(54) SYSTEM FOR MANUFACTURING MOLDED PRODUCT AND APPARATUS FOR TAKING OUT MOLDED PRODUCT

(71) Applicant: Yushin Precision Equipment Co., Ltd., Kyoto (JP)

(72) Inventors: Mitsuharu Hamahata, Kyoto (JP); Koji Ikeda, Kyoto (JP); Ryuichi Kanazawa, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 141 days.

(21) Appl. No.: 16/567,515

(22) Filed: Sep. 11, 2019

(65) Prior Publication Data

US 2020/0092377 A1    Mar. 19, 2020

(30) Foreign Application Priority Data

Sep. 14, 2018 (JP) .............................. JP2018-172548
Sep. 9, 2019 (JP) .............................. JP2019-163540

(51) Int. Cl.
  *H04L 29/08* (2006.01)
  *B29C 45/76* (2006.01)
(52) U.S. Cl.
  CPC ............ *H04L 67/125* (2013.01); *B29C 45/76* (2013.01); *B29C 2945/76006* (2013.01); *B29C 2945/76494* (2013.01)
(58) Field of Classification Search
  CPC ........... B29C 2945/76494; B29C 2945/76993; B29C 45/76; B29C 2945/76006; H04L 67/125
  See application file for complete search history.

(56) References Cited

U.S. PATENT DOCUMENTS

| 4,674,053 A * | 6/1987 | Bannai .................... B29C 45/76 700/197 |
| 2004/0093114 A1 | 5/2004 | Magario et al. |
| 2006/0068049 A1 | 3/2006 | Nishizawa |
| 2006/0082010 A1 | 4/2006 | Saggese et al. |

(Continued)

FOREIGN PATENT DOCUMENTS

DE    10 2004 052 499    7/2006

OTHER PUBLICATIONS

2017 Yushin Precision Equipment Co., Ltd., Products, FRA: High-End Take-out Robots, Discussed in specification, 5 pages.

*Primary Examiner* — Frantz B Jean
(74) *Attorney, Agent, or Firm* — Rankin, Hill & Clark LLP

(57) ABSTRACT

There are provided a molded product manufacturing system that can be easily adapted to IoT and an apparatus for taking out a molded product that can promote adaptation of the molded product manufacturing system to IoT. A molded product manufacturing system includes an injection molding machine, an apparatus for taking out a molded product, and one or more peripheral devices arranged around the apparatus to operate together during operation of the apparatus. The apparatus includes a communication unit operable to transmit internal data to an external server via a communication network. The communication unit of the apparatus transmits external data, which is output from the one or more peripheral devices, to external servers together with information on a die.

16 Claims, 5 Drawing Sheets

(56) References Cited

U.S. PATENT DOCUMENTS

2008/0290541 A1* 11/2008 Baumann ............ B29C 45/2725
264/40.6
2016/0375701 A1* 12/2016 Osterday ................ B29C 44/58
156/245
2018/0345557 A1* 12/2018 Kang .................. B29C 45/7626

* cited by examiner

SYSTEM FOR MANUFACTURING MOLDED PRODUCT AND APPARATUS FOR TAKING OUT MOLDED PRODUCT

TECHNICAL FIELD

The present invention relates to a system for manufacturing a molded product, in which at least one of a molding machine and an apparatus for taking out a molded product includes a communication device operable to transmit internal data to an external server via a communication network.

BACKGROUND ART

IoT (Internet of Things) has recently been put into practical use for the purpose of predictive maintenance. IoT is practically used in apparatuses for taking out a molded product from a molding machine. In the field of the apparatuses for taking out a molded product, for example, IoT was first introduced to the apparatus manufactured and sold by the applicant under the trade name "FRA (registered trademark)" (Yushin Precision Equipment Co., Ltd., title "FRA|Products|Yushin Precision Equipment Co., Ltd-.|Manufacturer of Robots (Apparatuses) for Taking Out Plastic Injection-Molded Product", date of search: Sep. 3, 2018, URL:www.ype.co.jp/product/detail/fra.html). However, systems for manufacturing a molded product including a molding machine, an apparatus for taking out a molded product, and peripheral devices are yet to be adapted to IoT.

SUMMARY OF INVENTION

Technical Problem

The system for manufacturing a molded product (hereinafter referred to as "molded product manufacturing system") includes, besides the molding machine and the apparatus for taking out a molded product, a variety of peripheral devices such as a temperature adjustment device, a pressure sensor operable to measure the pneumatic pressure of an air cylinder, a weighing scale device operable to measure the weight of the molded product which has been taken out, an image diagnosis device operable to image the shape of the molded product to measure deformation of the molded product and a shortage of a resin, a cutter device operable to cut the molded product from a gate, and a label printer operable to print a label to be pasted to the molded product. There are also existing apparatuses for taking out a molded product in the manufacturing plant. Therefore, sufficient information needed for predictive maintenance of the molded product manufacturing system may not be collected even if new apparatuses for taking out a molded product are adapted to IoT, which delays adaption of the molded product manufacturing system to IoT.

An object of the present invention is to provide a molded product manufacturing system that is easily adaptable to IoT.

Another object of the present invention is to provide an apparatus for taking out a molded product that promotes adaptation of the molded product manufacturing system to IoT.

Solution to Problem

The present invention is directed to a molded product manufacturing system including a molding machine, an apparatus for taking out a molded product, and one or more peripheral devices arranged around the apparatus to operate together during operation of the apparatus. In the present invention, at least one of the molding machine and the apparatus includes a communication device operable to transmit internal data to an external server together with identification information on a die mounted to the molding machine via a communication network. The identification information on the die includes, but is not limited to, an identification number assigned to the die, an identification symbol, and a barcode attached to the die. The communication device is configured to transmit external data, which is output from the one or more peripheral devices, to the external server together with the identification information on the die. The communication device also has a function of transmitting the data to the external server and other devices.

In the current situation, in order to promote adaptation to IoT, it is practically necessary to use a communication infrastructure (network) dedicated to IoT because of issues such as the communication cost and the communicable range etc. Therefore, it requires an enormous cost if peripheral device manufacturers individually promote adaptation to IoT, which obstructs adaptation to IoT. The present invention is made in view of the current situation in which the molding machine and the apparatus for taking out a molded product, which play a central role in the molded product manufacturing system, and enables the molded product manufacturing system to be adapted to IoT in a simple and inexpensive way by allowing the output data from the peripheral devices to be transmitted to the external server using a communication infrastructure for IoT of at least one of the molding machine and the apparatus. In that event, in the present invention, the identification information on the die mounted to the molding machine is transmitted together with the data transmitted to the external server. Thus, data accumulated in the external server can be used based on the specified or identified die. The die is replaced for a different molded product. If the die is specified or identified, the shape, dimension, and prescribed weight of the molded product can be specified. Therefore, the information on the die is significantly useful to predict occurrence of a fault in the molded product and the cause of the occurrence of the fault. The precision of predictive maintenance can be enhanced if all the data accumulated in the external server is associated with the die.

The communication device may add information on molding cycles during communication to the identification information on the die. The molding cycles during communication include at least one of molding sequence information on molding of the molded product by the molding machine during communication and take-out sequence information on take-out by the apparatus. If the information on the molding cycles is sent to the external server together with the data during communication in addition to the die information, the precision of predictive maintenance can be further enhanced in consideration of the timing of molding operation and/or the timing of take-out operation.

The communication device may transmit the external data and the internal data together as a packet to the external server. The external server may receive the packet. Consequently, communication can be performed while the communication network is idle or available.

The communication device may individually transmit the external data from the one or more peripheral devices to the external server. Consequently, the external data that is necessary for each of the plurality of external servers can be reliably transmitted.

The communication device may include one or more external device connection terminals for communication with the one or more peripheral devices, and the one or more peripheral devices may be connected to the one or more external device connection terminals via a communication cable. With this configuration, the molded product manufacturing system including the peripheral devices can be adapted to IoT by simply connecting the communication cable in terms of hardware.

The one or more peripheral devices may include one or more existing apparatuses for taking out a molded product or the one or more existing apparatuses and one or more peripheral devices for the one or more existing apparatuses. With this configuration, the external data from a larger number of peripheral devices can be transmitted to the external server.

The communication device may have a function of transmitting a signal from the external server to the one or more peripheral devices. In this case, the external server includes a reference data conversion unit operable to convert reference data into interpretable data, the reference data being part of the internal data or the external data that is transmitted via the communication device and that can be referenced by one or more particular peripheral devices determined in advance, among the one or more peripheral devices, and the interpretable data being data that can be interpreted by the one or more particular peripheral devices or a setter of the one or more particular peripheral devices, and the external server transmits the interpretable data generated by the reference data conversion unit to the one or more particular peripheral devices or a communication terminal device that the setter has. With this configuration, the necessary interpretable data can be directly transmitted to the particular peripheral device using the communication device.

Also in this case, the external server may further include a conversion condition setting unit operable to set a condition for the reference data conversion unit to convert the data that can be referenced in accordance with an external instruction. With this configuration, advantageously, the condition for converting the interpretable data can be easily set.

The present invention is also directed to an apparatus for taking out a molded product, including a communication device operable to transmit internal data to an external server via a communication network. The communication device is configured to transmit external data, which is output from one or more peripheral devices arranged around the apparatus to operate together during operation of the apparatus, to the external server together with identification information on a die mounted to a molding machine. If the apparatus is a device that is originally IoT-compatible, the external data which is output from the peripheral devices can be transmitted to the external server in an easy and inexpensive way using a communication infrastructure provided in advance, which supports adaptation of the peripheral devices to IoT.

The communication device may transmit the external data and the internal data together as a packet to the external server. Consequently, communication can be performed while the communication network is idle or available.

The communication device may individually transmit the external data from the one or more peripheral devices to the external server. Consequently, the external data that is necessary for each of the plurality of external servers can be reliably transmitted.

DESCRIPTION OF EMBODIMENTS

Figure 1:
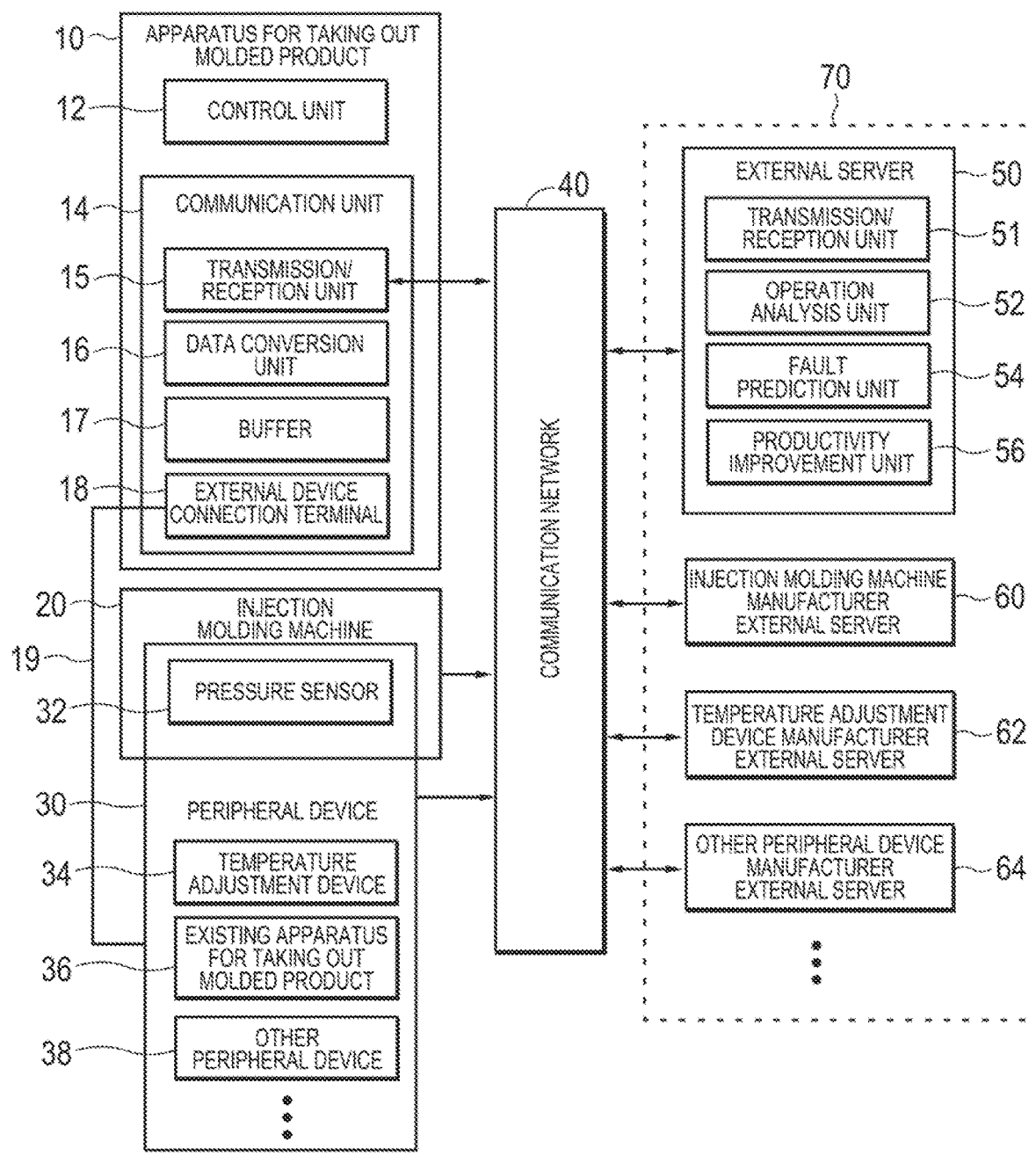
FIG. 1 is a block diagram illustrating main components of an apparatus for taking out a molded product according to an embodiment of the present invention and a system for manufacturing a molded product according to the embodiment of the present invention including the apparatus.

Embodiments of the present invention will be described below with reference to the drawings. FIG. 1 is a block diagram illustrating main components of a system for manufacturing a molded product (hereinafter referred to as a "molded product manufacturing system") according to a first embodiment of the present invention.

In FIG. 1, a molded product manufacturing system according to the present embodiment includes an apparatus 10 for taking out a molded product (hereinafter referred to as a "apparatus 10"), an injection molding machine 20, and peripheral devices 30. The injection molding machine 20 constitutes the core of the molded product manufacturing system. The other devices assist operation of the injection molding machine 20.

The apparatus 10 is provided on top of or adjacent to the injection molding machine 20 to take out a molded product from a die of the injection molding machine 20, cut a gate, and place the molded product at a predetermined location. Operation of the apparatus 10 is controlled by a control unit 12.

In the present embodiment, the apparatus 10 includes a communication unit 14 that constitutes apart of an IoT-compatible communication device operable to transmit internal data to an external server 50 via a communication network 40. That is, the communication unit 14 includes a transmission/reception unit 15 operable to transmit and receive internal data via the communication network 40, a data conversion unit 16 operable to convert the internal data into a form suitable for transmission, and a buffer 17 operable to temporarily store the internal data which has been converted and not transmitted yet. The buffer 17 stores, as the internal data, the operation status (including a take-out sequence) of the apparatus 10, the operation status (including a molding sequence) provided from the injection molding machine 20, various types of data such as information on the die mounted to the injection molding machine 20, output data from various types of sensors mounted to the apparatus 10, etc. Such data is output to the transmission/reception unit 15 according to a control program installed in a computer or a processor of the control unit 12.

The peripheral devices 30 mean devices arranged around the apparatus 10 to operate together during operation of the apparatus 10. Herein, the peripheral devices 30 include devices that constitute the injection molding machine 20, in particular. For example, a pressure sensor 32 measures the pneumatic pressure of an air cylinder operable to open and close the die of the injection molding machine 20. Examples of the peripheral devices that are independent of the apparatus 10 and the injection molding machine 20 include a temperature adjustment device 34. The temperature adjustment device 34 supplies a heat medium to the injection molding machine 20 to adjust the temperature of the die of the injection molding machine 20. For examples, the other peripheral devices 38 include various types of actuators, an image processing device including an imaging device, a weighing scale device, a component analysis device, a cutter device, a laser marker, an ultrasonic welder, a PLC, an FA personal computer, a six-axis robot, a cylinder device, and a paint (label) printer.

In the present embodiment, the peripheral devices 30 also include existing apparatuses 36 for taking out a molded product. The existing apparatuses 36 can be adapted to IoT by being connected to the apparatus 10 according to the present embodiment, even if the existing apparatuses 36 are not IoT-compatible models. In the present embodiment, in addition, the external data which indicates operation of the injection molding machine 20 itself, which constitutes the core of the molded product manufacturing system, is also transmitted to the apparatus 10. As a result, the apparatus 10 can also be included in the peripheral devices in view of adaptation to IoT according to the present embodiment.

In the present embodiment, the communication unit 14 of the apparatus 10 communicates with the injection molding machine 20, the peripheral devices 30, and the external server 50 via the communication network 40, and includes a plurality of external device connection terminals 18 for communication with the plurality of peripheral devices 30. The plurality of peripheral devices 30 are connected to the plurality of external device connection terminals 18 via a plurality of communication cables 19. Consequently, the molded product manufacturing system including the peripheral devices 30 can be adapted to IoT by simply connecting the communication cables 19 between the external device connection terminals 18 and the peripheral devices 30 in terms of hardware.

The type of the communication network 40 which connects between the apparatus 10 and the peripheral devices 30 is not specifically limited, and may be a wired or wireless LAN, for example. Data may be transmitted and received via an industrial personal computer. Other examples of the communication method not via the communication network 40 include near-field wireless communication, besides the communication cables 19.

In contrast, the communication network 40 which connects between the apparatus 10 and the external server 50 inevitably includes the Internet. However, additional use of other networks such as a LAN and a dedicated line is not excluded.

The external server 50 receives internal data from the apparatus 10 via a transmission/reception unit 51 that constitutes a part of the communication device to optimize operation of the apparatus 10, achieve predictive maintenance, etc. In the present embodiment, a server that constitutes apart of a server in a cloud server 70 is used as the external server 50. In the present embodiment, in the external server 50, an operation analysis unit 52 analyzes the internal data, a fault prediction unit 54 predicts the time and the location of a fault from the analysis results, and a productivity improvement unit 56 improves productivity by automatically updating a program and parameters for the apparatus 10. In the present embodiment, identification information on the die mounted to the injection molding machine 20 is transmitted together with the internal data transmitted to the external server 50. Thus, data accumulated in the external server 50, mainly the identification information on the die, can be used. The die is replaced for a different molded product. If the die is identified, the shape, dimension, and prescribed weight of the molded product to be molded can be specified. Therefore, the identification information on the die is significantly useful to predict occurrence of a fault in the molded product and the cause of the occurrence of the fault. The precision of predictive maintenance can be enhanced if all the data accumulated in the external server 50 is associated with the identification information on the die.

In the present embodiment, in addition, the communication unit 14 adds information on molding cycles during communication to the identification information on the die. The molding cycles during communication include at least one of molding sequence information on molding of the molded product by the injection molding machine 20 during communication and take-out sequence information on take-out by the apparatus 10. If the information on the molding cycles is sent to the external server 50 together with the data during communication in addition to the die information, the precision of predictive maintenance can be further enhanced in consideration of the timing of molding operation and the timing of take-out operation.

The apparatus 10 transfers the data to an injection molding machine manufacturer external server 60, a temperature adjustment device manufacturer external server 62, another peripheral device manufacturer external server 64, . . . , which are external servers other than the external server 50 constituted in the cloud server 70.

Next, operation according to the present embodiment will be described. As discussed above, the communication unit 14 which is mounted to the apparatus 10 according to the present embodiment can transmit internal data to the external server 50 via the transmission/reception unit 51 in the cloud server 70 and the communication network 40, and also transmit external data output from the peripheral devices 30 (including the injection molding machine 20) to the external servers 60, 62, 64, . . . other than the external server 50. That is, for IoT adaptation, the apparatus 10 according to the present embodiment functions as a hub for the peripheral devices 30, and also functions as a communication gateway operable to connect between the peripheral devices 30 and the Internet.

The communication unit 14 of the apparatus 10 receives the external data from the peripheral devices 30 which are connected via the communication network 40 and the communication cables 19. The specific content of the external data differ for the peripheral devices 30. Examples of such content include a value indicating the magnitude of the pressure for each injection operation for the pressure sensor 32, and the temperature of the heat medium which is varied over time in order to maintain the temperature of the die within an appropriate range for the temperature adjustment device 34.

Figure 2:
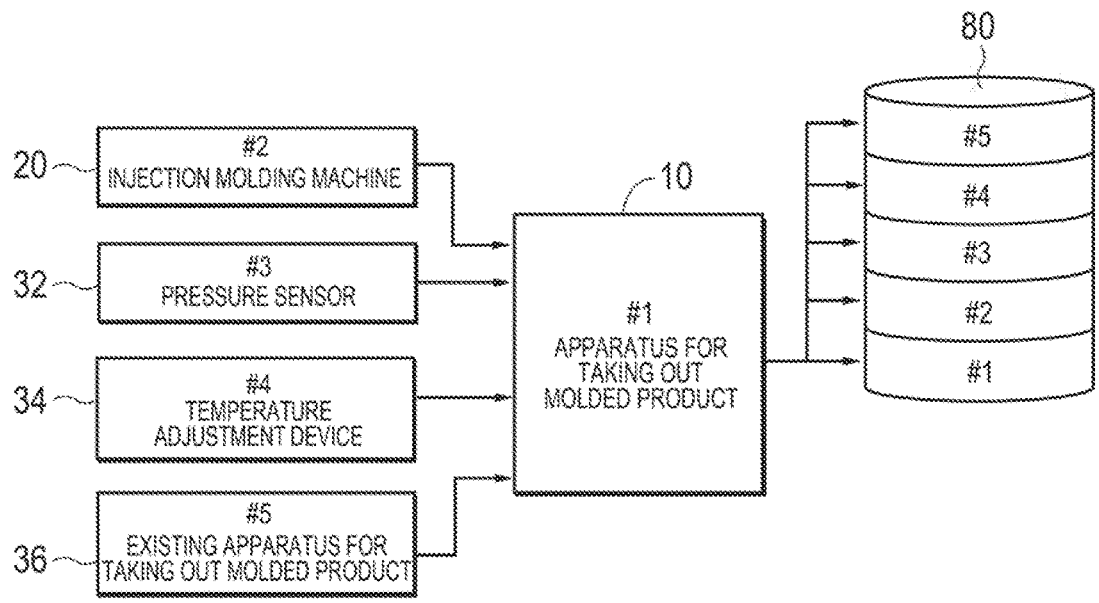
FIG. 2 illustrates an example of the configuration of data for the system in FIG. 1.

When the communication unit 14 receives the external data, the data conversion unit 16 converts the external data into a form suitable for transmission to the external servers 60, 62, 64. FIG. 2 illustrates an example of the configuration of the converted data. The data conversion unit 16 converts the external data into a packet 80 together with the internal data. The packet 80 is composed of the numbered internal data (#1) from the apparatus 10, the external data (#2) from the injection molding machine 20, the external data (#3) from the pressure sensor 32, the external data (#4) from the temperature adjustment device 34, the external data (#5) from the existing apparatus 36, and the external data (#6, not illustrated) from the other peripheral devices 38, which are combined together.

The packet 80 is temporarily stored in the buffer 17. The communication unit 14 reads the packet 80 from the buffer 17 while the communication network 40 is idle or available, and sends the packet 80 to the cloud server 70 including the external servers 50, 60, 62, and 64. All the external servers 50, 60, 62, and 64 receive the same packet 80. For example, the packet 80 is prepared at intervals of a predetermined time, and transmitted at a predetermined time. With this configuration, data communication can be performed while the communication network 40 is idle or available.

Figure 3:
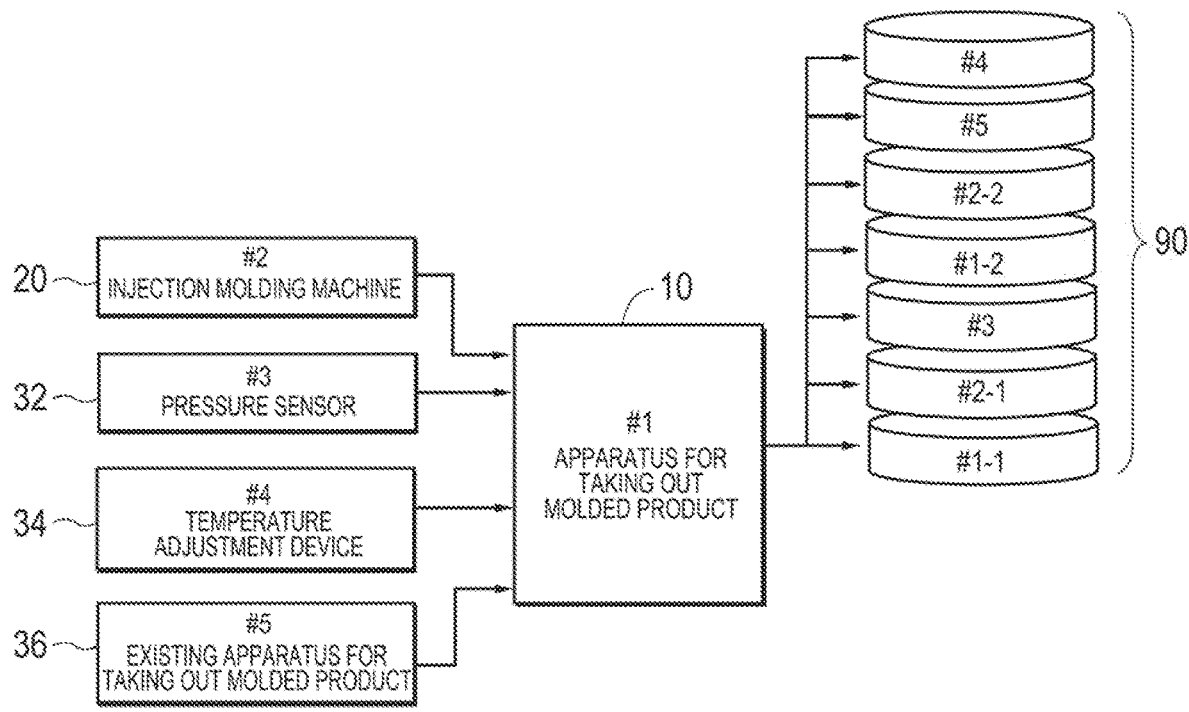
FIG. 3 illustrates another example of the configuration of data for the system in FIG. 1.

FIG. 3 illustrates another example of the configuration of the converted data. The data conversion unit 16 converts the internal data from the apparatus 10 and the external data from the peripheral devices 30 into individual data 90 to be individually transmitted to the external servers 50, 60, 62, 64. The individual data 90 are individually transmitted according to the order of priority. In the example in FIG. 3, the individual data 90 are individually transmitted in the order of the internal data (#1-1) from the apparatus 10, the external data (#2-1) from the injection molding machine 20, the external data (#3) from the pressure sensor 32, the internal data (#1-2) from the apparatus 10, the external data (#2-2) from the injection molding machine 20, the external data (#5) from the existing apparatus 36, and the external data (#4) from the temperature adjustment device 34.

The internal data from the apparatus 10 and the external data from the injection molding machine 20 are prepared at intervals of a predetermined relatively short time, for example, and sequentially sent. The external data from the pressure sensor 32 and the temperature adjustment device 34 are prepared at intervals of a predetermined relatively long time, and sent. The individual data 90 are temporarily stored in the buffer 17. The communication unit 14 individually sends each data to each of external servers 50, 60, 62, 64. Each of external servers 50, 60, 62, and 64 receives only the internal data and the external data related to the manufacture by the respective manufacturers.

The individual data configuration illustrated in FIG. 3 is particularly suitable when real-time monitoring etc. is necessary.

As described above, the molded product manufacturing system according to the present embodiment uses a communication infrastructure for IoT conversion of the apparatus 10, which plays a central role in the molded product manufacturing system, in order to transmit the output data from the peripheral devices 30, together with the information on the die and the information on the molding cycles, to the external servers 60, 62, 64. As a result, it is possible to realize IoT of a molded product manufacturing system easily and inexpensively.

Figure 4:
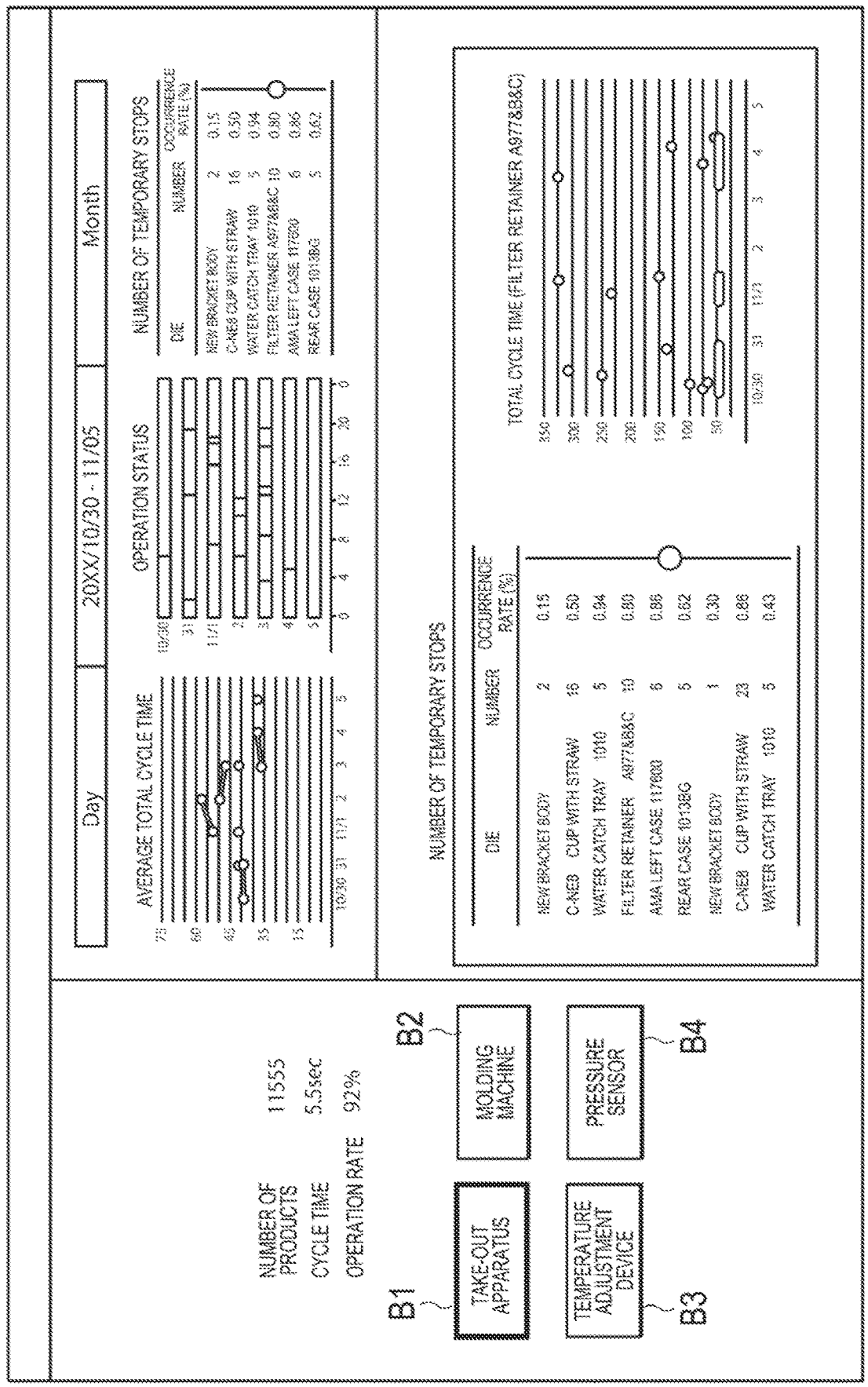
FIG. 4 illustrates an example of a display screen of an external communication terminal operable to access an external server.

FIG. 4 illustrates an example of a display screen of an external communication terminal operable to access the external server 70. Internal information on the apparatus 10 and the result of analyzing the information is displayed on the display screen as a result of pressing a select button B1. Select buttons B2, B3, and B4 may be pressed to see external information from the molding machine, the temperature adjustment device, and the pressure sensor, respectively.

Other Embodiments

Figure 5:
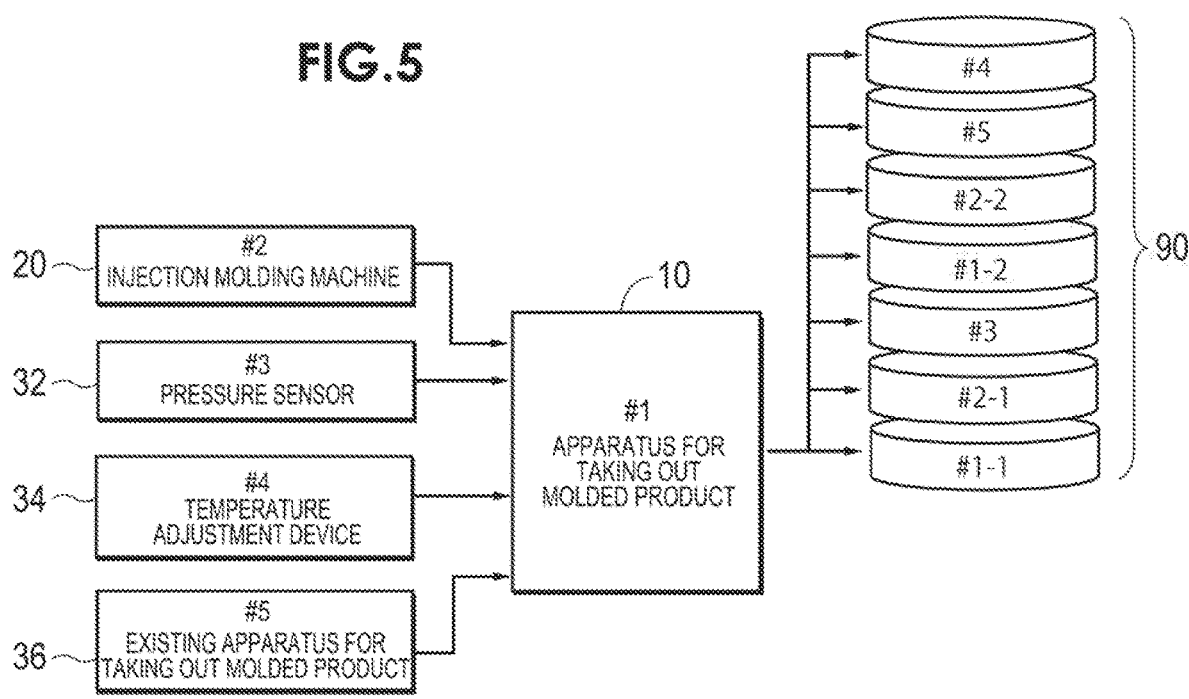
FIG. 5 is a block diagram illustrating main components of a system for manufacturing a molded product according to another embodiment of the present invention.

In the embodiment in FIG. 1 described above, the apparatus includes the communication unit 14 which serves as an IoT-compatible communication device operable to transmit internal data to the external server 50 via the communication network 40. However, the injection molding machine 20 may include the communication unit 14 which serves as an IoT-compatible communication device operable to transmit internal data to the external server 50 via the communication network 40 as illustrated in FIG. 5. In this case, the communication unit 14 of the injection molding machine 20 transmits the internal data from the apparatus 10, together with the information on the die and the information on the molding cycles, to the external server 50 via the communication network 40. Regarding the other components, the internal components of the apparatus 10 and those of the injection molding machine 20 in FIG. 1 have been interchanged.

In the embodiment in FIG. 1 described above, the apparatus 10 includes the communication unit 14 which constitutes a part of an IoT-compatible communication device operable to transmit internal data to the external server 50 via the communication network 40. However, not only the apparatus 10 but also the injection molding machine 20 may include an IoT-compatible communication device operable to transmit internal data to the external server 50 via the communication network 40. In this case, the communication unit 14 of one or both of the apparatus 10 and the injection molding machine 20 may transmit internal data to the external server 50 via the communication network 40.

Figure 6:
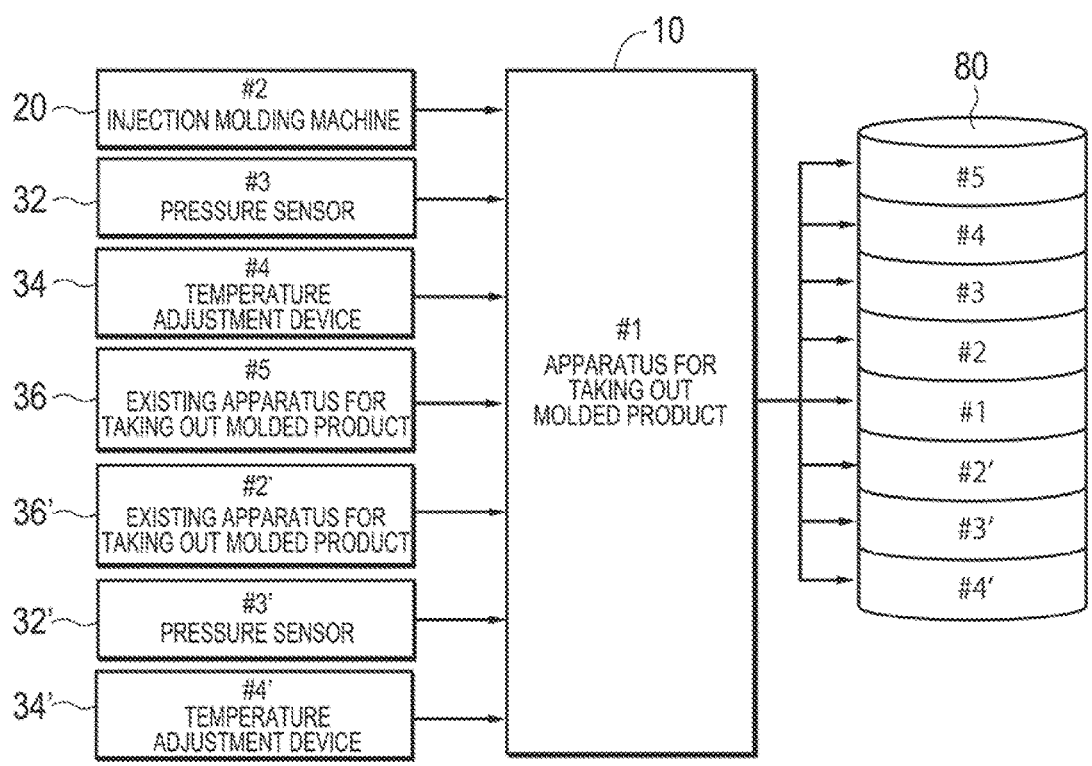
FIG. 6 is a block diagram illustrating main components of a system for manufacturing a molded product according to still another embodiment of the present invention.

The one or more peripheral devices may include a plurality of existing apparatuses 36 and 36' for taking out a molded product as illustrated in FIG. 6. In this case, the one or more peripheral devices may also include peripheral devices [pressure sensor 32' (#3') and temperature adjustment device 34' (#4')] of the existing apparatus 36' (#2') for taking out a molded product.

Figure 7:
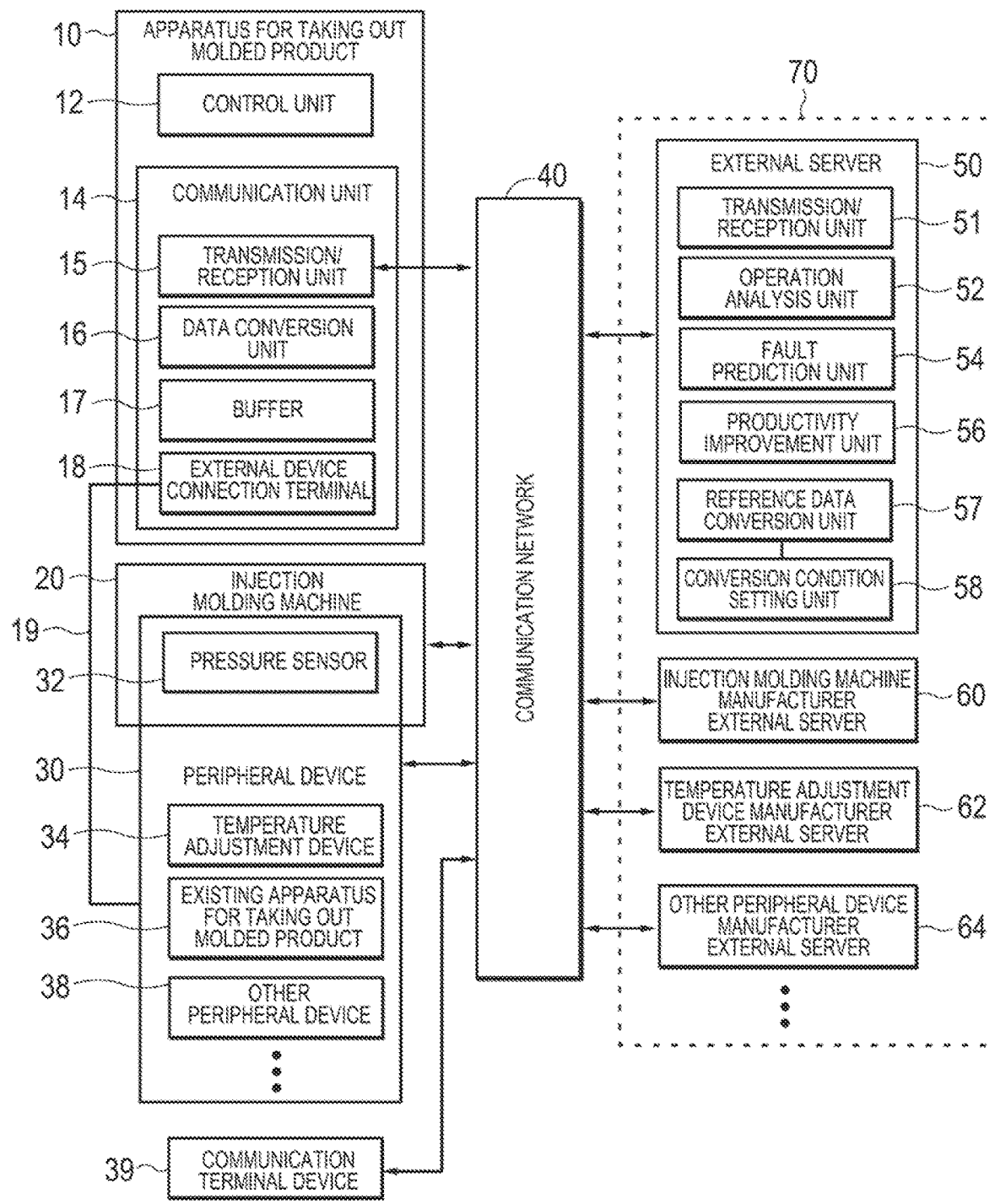
FIG. 7 is a block diagram illustrating main components of an apparatus for taking out a molded product according to a different embodiment of the present invention and a system for manufacturing a molded product according to the different embodiment of the present invention including the apparatus.

FIG. 7 is a block diagram illustrating main components of a molded product manufacturing system according to a second embodiment of the present invention. Elements in FIG. 7 that are the same as those constituting the first embodiment in FIG. 1 are denoted by the same reference numerals as those used in FIG. 1 to omit description. In the second embodiment, the external server 50 includes a reference data conversion unit 57 and a conversion condition setting unit 58. The transmission/reception unit 51 which constitutes a part of the communication device has a function of transmitting a signal from the external server 50 to the molding machine 20, the apparatus 10 or one or more peripheral devices 30, and a communication terminal device 39.

In the present embodiment, the external server 50 includes the reference data conversion unit 57 operable to convert reference data into interpretable data, the reference data being part of the internal data or the external data that is transmitted via the communication device and that can be referenced by one or more particular peripheral devices determined in advance (e.g. temperature adjustment device 34), among the one or more peripheral devices 30, and the interpretable data being data that can be interpreted by the one or more particular peripheral devices (temperature adjustment device 34) or a setter or an operator of the one or more particular peripheral devices. Examples of the reference data include an error signal output from the apparatus 10. The error signal output from the apparatus 10 as the internal data is often uninterpretable when received as it is by the temperature adjustment device 34. Thus, the reference data conversion unit 57 converts the error signal (reference data) into the interpretable data that can be interpreted by the control unit of the temperature adjustment device 34. The transmission/reception unit 51 transmits the interpretable data generated by the reference data conversion unit 57 to the communication terminal device 39 which is operated by the one or more particular peripheral devices (temperature adjustment device 34) or the setter or the operator. With this configuration, the necessary interpretable data can be directly transmitted to the particular peripheral device using the communication device. As a result, the particular peripheral device can obtain the necessary data easily compared to the related art.

The conversion condition setting unit 58 of the external server 50 has a function of setting a condition for the reference data conversion unit 57 to convert the data that can be referenced in accordance with an external instruction. With the provision of the conversion condition setting unit 58, the condition for converting the interpretable data can be easily set from the particular peripheral device (temperature adjustment device 34) or the communication terminal device 39.

According to the present invention, the molded product manufacturing system can be adapted to IoT in a simple and inexpensive way using the communication infrastructure for adaptation to IoT of at least one of the molding machine and the apparatus for taking out a molded product.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. A system for manufacturing a molded product, comprising a molding machine, an apparatus for taking out a molded product, and one or more peripheral devices arranged around the apparatus to operate together during operation of the apparatus, wherein:
    at least one of the molding machine and the apparatus includes a communication device operable to transmit internal data to an external server together with identification information on a die mounted to the molding machine via a communication network;
    the communication device is configured to transmit external data, which is output from the one or more peripheral devices, to the external server together with the identification information on the die;
    the communication device includes one or more external device connection terminals for communication with the one or more peripheral devices; and
    the one or more peripheral devices are connected to the one or more external device connection terminals via a communication cable.

2. The system for manufacturing a molded product according to claim 1, wherein the communication device adds information on molding cycles during communication to the identification information on the die.

3. The system for manufacturing a molded product according to claim 1, wherein the communication device transmits the external data and the internal data together as a packet to the external server.

4. The system for manufacturing a molded product according to claim 2, wherein the communication device transmits the external data and the internal data together as a packet to the external server.

5. The system for manufacturing a molded product according to claim 1, wherein the communication device individually transmits the external data from the one or more peripheral devices to the external server.

6. The system for manufacturing a molded product according to claim 2, wherein the communication device individually transmits the external data from the one or more peripheral devices to the external server.

7. The system for manufacturing a molded product according to claims 1, wherein the one or more peripheral devices include one or more existing apparatuses for taking out a molded product or the one or more existing apparatuses and one or more peripheral devices for the one or more existing apparatuses.

8. The system for manufacturing a molded product according to claims 2, wherein the one or more peripheral devices include one or more existing apparatuses for taking out a molded product or the one or more existing apparatuses and one or more peripheral devices for the one or more existing apparatuses.

9. The system for manufacturing a molded product according to claims 3, wherein the one or more peripheral devices include one or more existing apparatuses for taking out a molded product or the one or more existing apparatuses and one or more peripheral devices for the one or more existing apparatuses.

10. The system for manufacturing a molded product according to claims 5, wherein the one or more peripheral devices include one or more existing apparatuses for taking out a molded product or the one or more existing apparatuses and one or more peripheral devices for the one or more existing apparatuses.

11. A system for manufacturing a molded product, comprising a molding machine, an apparatus for taking out a molded product, and one or more peripheral devices arranged around the apparatus to operate together during operation of the apparatus, wherein:
    at least one of the molding machine and the apparatus includes a communication device operable to transmit internal data to an external server together with identification information on a die mounted to the molding machine via a communication network;
    the communication device is configured to transmit external data, which is output from the one or more peripheral devices, to the external server together with the identification information on the die;
    the communication device has a function of transmitting a signal from the external server to the one or more peripheral devices; and
    the external server includes a reference data conversion unit operable to convert reference data into interpretable data, the reference data being part of the internal data or the external data that is transmitted via the communication device and that can be referenced by one or more particular peripheral devices determined in advance, among the one or more peripheral devices, and the interpretable data being data that can be interpreted by the one or more particular peripheral devices or a setter or an operator of the one or more particular peripheral devices, and the external server transmits the interpretable data generated by the reference data conversion unit to the one or more particular peripheral devices or a communication terminal device operated by the setter or the operator.

12. The system for manufacturing a molded product according to claim 11, wherein the external server further includes a conversion condition setting unit operable to set a condition for the reference data conversion unit to convert the data that can be referenced in accordance with an external instruction.

13. An apparatus for taking out a molded product, including a communication device operable to transmit internal data to an external server via a communication network, wherein:
   the communication device is configured to transmit external data, which is output from one or more peripheral devices arranged around the apparatus to operate together during operation of the apparatus, to the external server together with identification information on a die mounted to a molding machine;
   the communication device includes one or more external device connection terminals for communication with the one or more peripheral devices; and
   the one or more peripheral devices are connected to the one or more external device connection terminals via a communication cable.

14. The apparatus for taking out a molded product according to claim 13, wherein the communication device transmits the external data and the internal data together as a packet to the external server.

15. The apparatus for taking out a molded product according to claim 13, wherein the communication device individually transmits the external data from the one or more peripheral devices to the external server.

16. The apparatus for taking out a molded product according to claim 14, wherein the communication device individually transmits the external data from the one or more peripheral devices to the external server.

* * * * *